(12) United States Patent
Kershaw et al.

(10) Patent No.: US 7,653,547 B2
(45) Date of Patent: Jan. 26, 2010

(54) METHOD FOR TESTING A SPEECH SERVER

(75) Inventors: Daniel Jeremy Kershaw, Kirkland, WA (US); Daniel T. Herron, Sammamish, WA (US); Anand Ramakrishna, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 806 days.

(21) Appl. No.: 11/095,816

(22) Filed: Mar. 31, 2005

(65) Prior Publication Data

US 2006/0224392 A1 Oct. 5, 2006

(51) Int. Cl.
*G10L 21/00* (2006.01)

(52) U.S. Cl. ....................................... 704/275
(58) Field of Classification Search ................. 704/270, 704/270.1, 2, 275; 348/48
See application file for complete search history.

(56) References Cited

U.S. PATENT DOCUMENTS

| | | | | |
|---|---|---|---|---|
| 6,018,708 A * | 1/2000 | Dahan et al. | ................. | 704/244 |
| 6,092,045 A * | 7/2000 | Stubley et al. | ............... | 704/254 |
| 6,335,927 B1 * | 1/2002 | Elliott et al. | ................ | 370/352 |
| 6,418,424 B1 * | 7/2002 | Hoffberg et al. | ............... | 706/21 |
| 6,473,794 B1 * | 10/2002 | Guheen et al. | .............. | 709/223 |
| 6,934,756 B2 * | 8/2005 | Maes | .......................... | 709/227 |
| 6,964,023 B2 * | 11/2005 | Maes et al. | .................. | 715/811 |
| 7,260,535 B2 * | 8/2007 | Galanes et al. | .............. | 704/270 |

OTHER PUBLICATIONS

NACT VoIP Industry Tutorial, NACT Telecommunications, Inc., Apr. 11, 2001, pp. 1-14.
SIP: The Promise Becomes Reality, White Paper, Copyright 1992-2001 Cisco Systems, Inc., pp. 1-8.
Guide to Cisco Systems VoIP Infrastructure Solution for SIP, Overview of the Session Initiation Protocol, Chapter 1, pp. 1-8, 2003.
Session Initiation Protocol—Wikipedia, the free encyclopedia, Feb. 2, 2005, http://en.wikipedia.org/wiki/Session_Initiation_Protocol, pp. 1-3.
Communications Infrastructure Test Group, Hammer Universal Port with Modem, Sep. 2001.
http://www.sipcenter.com/sip.nsf/html/what+is+sip+introduction, Feb. 3, 2005, pp. 1-3.

(Continued)

*Primary Examiner*—Michael N Opsasnick
(74) *Attorney, Agent, or Firm*—Joseph R. Kelly; Westman, Champlin & Kelly, P.A.

(57) ABSTRACT

One aspect of the present invention relates to simulating an interaction between a client and a server. A session is established between the client and the server to conduct a test. Testing data is transmitted from the client to the server. The server processes the testing data and provides an in-band signal indicative of a response based on the testing data. The server also provides an out-of-band signal indicative of testing synchronization information related to the test.

16 Claims, 6 Drawing Sheets

OTHER PUBLICATIONS

Communications infrastructure test group, Empirix, Voice Quality Test Suite, Mar. 2002 pp. 1-4.

Empirix, Hammer CallMaster, Single Integrated Environment For Development, Debug, Scheduling and Reporting of Hammer Test Scripts, 2004, pp. 1 of 2.

Empirix, Winning with Enterprise VoIP, pp. 1-4, 2005.

Dr. Rajesh Balchandra, Linda Boyer, Taxonomy of speech-enabled applications, http://www-106.ibm.com/developers/library/wi-tax (1 of 5) Nov. 16, 2004.

Jonathan Eisenzopf, It's only Natural: Evaluating Natural Language Dialogs, Oct. 7, 2002, pp. 1-4.

* cited by examiner

METHOD FOR TESTING A SPEECH SERVER

BACKGROUND OF THE INVENTION

The present invention relates to methods and systems for simulating interactions between a user and a computer. In particular, the present invention relates to methods and systems for testing a system that provides speech services.

A speech server can be utilized to combine Internet technologies, speech-processing services, and telephony capabilities into a single, integrated system. The server can enable companies to unify their Internet and telephony infrastructure, and extend existing or new applications for speech-enabled access from telephones, mobile phones, pocket PCs and smart phones.

Applications from a broad variety of industries can be speech-enabled using a speech server. For example, the applications include contact center self-service applications such as call routing and customer account/personal information access. Other contact center speech-enabled applications are possible including travel reservations, financial and stock applications and customer relationship management. Additionally, information technology groups can benefit from speech-enabled applications in the areas of sales and field-service automation, E-commerce, auto-attendants, help desk password reset applications and speech-enabled network management, for example.

While these speech-enabled applications are particularly useful, the applications can be prone to errors resulting from a number of different situations. For example, the errors can relate to speech recognition, call control latency, insufficient capacity and/or combinations of these and other situations. Different testing systems have been developed in order to analyze these applications. However, these test systems provide limited functionality and can require specialized hardware in order to interface with the speech server.

SUMMARY OF THE INVENTION

One aspect of the present invention relates to simulating an interaction between a client and a server. A session is established between the client and the server to conduct a test. Simulated data is transmitted from the client to the server. The server processes the simulated data and provides an in-band signal indicative of a response based on the simulated data. The server also provides an out-of-band signal indicative of testing synchronization information related to the test.

Another aspect of the present invention relates to a computer readable medium having instructions for testing a speech application. The instructions include transmitting speech data to the speech application and receiving a prompt and a recognition result based on the speech data. The instructions also include comparing the prompt and the recognition result with an expected prompt and an expected recognition result.

Yet another aspect of the present invention relates to testing a speech application having a plurality of dialog states. Information indicative of a present dialog state is received from the speech application. The present dialog state is compared with an expected dialog state.

DETAILED DESCRIPTION OF ILLUSTRATIVE EMBODIMENTS

Before describing a system for testing speech services and methods for implementing the same, it may be useful to describe generally computing devices that can function in a speech service architecture. These devices can be used in various computing settings to utilize speech services across a computer network. For example, such services can include speech recognition, text-to-speech conversion and interpreting speech to access a database. The devices discussed below are exemplary only and are not intended to limit the present invention described herein.

Figure 1:
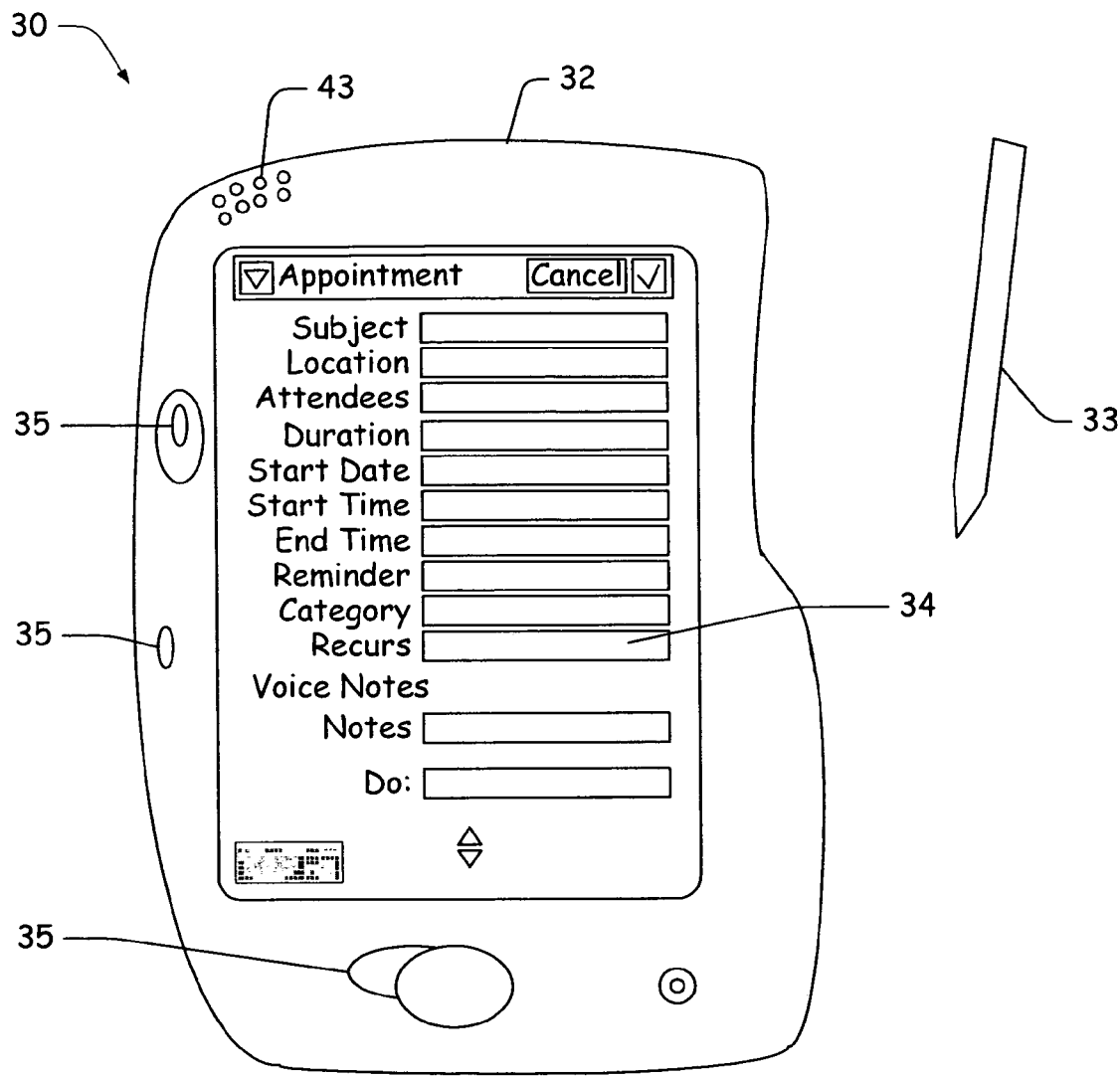
FIGS. 1-4 illustrate exemplary computing devices for use with the present invention.

An exemplary form of a data management mobile device 30 is illustrated in FIG. 1. The mobile device 30 includes a housing 32 and has a user interface including a display 34, which uses a contact sensitive display screen in conjunction with a stylus 33. The stylus 33 is used to press or contact the display 34 at designated coordinates to select a field, to selectively move a starting position of a cursor, or to otherwise provide command information such as through gestures or handwriting. Alternatively, or in addition, one or more buttons 35 can be included on the device 30 for navigation. In addition, other input mechanisms such as rotatable wheels, rollers or the like can also be provided. Another form of input can include a visual input such as through computer vision.

Figure 2:
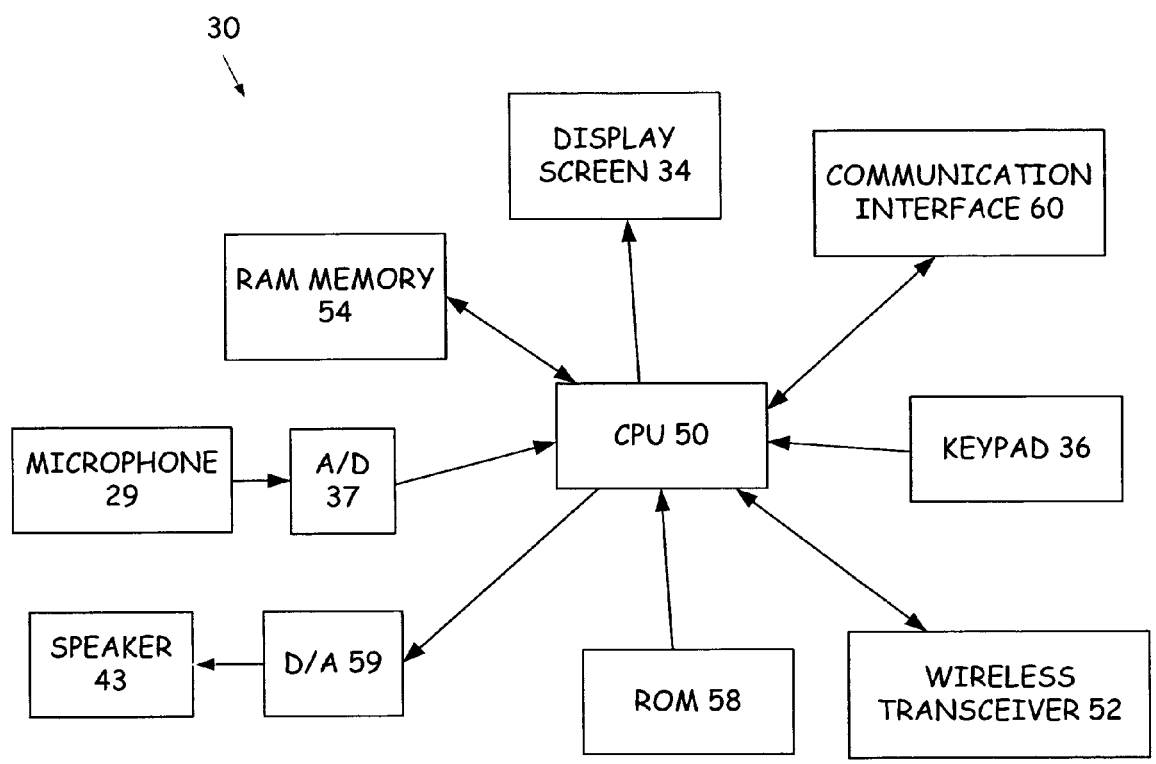

Referring now to FIG. 2, a block diagram illustrates the functional components comprising the mobile device 30. A central processing unit (CPU) 50 implements the software control functions. CPU 50 is coupled to display 34 so that text and graphic icons generated in accordance with the controlling software appear on the display 34. A speaker 43 can be coupled to CPU 50 typically with a digital-to-analog converter 59 to provide an audible output. Data that is downloaded or entered by the user into the mobile device 30 is stored in a non-volatile read/write random access memory store 54 bi-directionally coupled to the CPU 50. Random access memory (RAM) 54 provides volatile storage for instructions that are executed by CPU 50, and storage for temporary data, such as register values. Default values for configuration options and other variables are stored in a read only memory (ROM) 58. ROM 58 can also be used to store the operating system software for the device that controls the basic functionality of the mobile 30 and other operating system kernel functions (e.g., the loading of software components into RAM 54).

RAM 54 also serves as storage for the code in the manner analogous to the function of a hard drive on a PC that is used to store application programs. It should be noted that although non-volatile memory is used for storing the code, it alternatively can be stored in volatile memory that is not used for execution of the code.

Wireless signals can be transmitted/received by the mobile device through a wireless transceiver 52, which is coupled to CPU 50. An optional communication interface 60 can also be provided for downloading data directly from a computer (e.g., desktop computer), or from a wired network, if desired. Accordingly, interface 60 can comprise various forms of communication devices, for example, an infrared link, modem, a network card, or the like.

Mobile device 30 includes a microphone 29, an analog-to-digital (A/D) converter 37, and an optional recognition program (speech, DTMF, handwriting, gesture or computer vision) stored in store 54. By way of example, in response to audible information, instructions or commands from a user of device 30, microphone 29 provides speech signals, which are digitized by A/D converter 37. The speech recognition program can perform normalization and/or feature extraction functions on the digitized speech signals to obtain intermediate speech recognition results.

Using wireless transceiver 52 or communication interface 60, speech data is transmitted to remote speech engine services 204 discussed below and illustrated in the architecture of FIG. 5. Recognition results are then returned to mobile device 30 for rendering (e.g. visual and/or audible) thereon, and eventual transmission to a web server 202 (FIG. 5), wherein the web server 202 and mobile device 30 operate in a client/server relationship.

Similar processing can be used for other forms of input. For example, handwriting input can be digitized with or without pre-processing on device 30. Like the speech data, this form of input can be transmitted to the speech engine services 204 for recognition wherein the recognition results are returned to at least one of the device 30 and/or web server 202. Likewise, DTMF data, gesture data and visual data can be processed similarly. Depending on the form of input, device 30 (and the other forms of clients discussed below) would include necessary hardware such as a camera for visual input.

Figure 3:
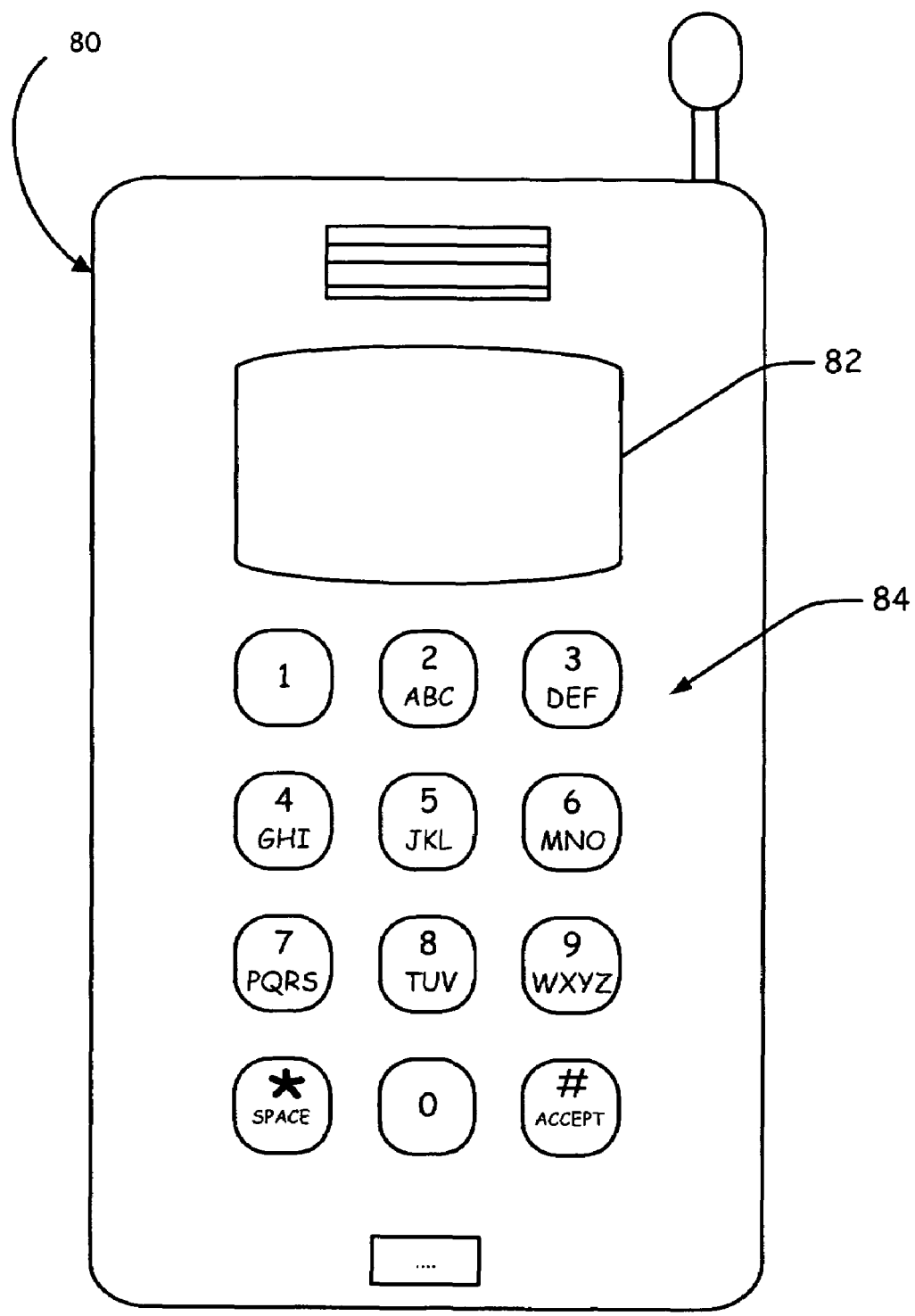

FIG. 3 is a plan view of an exemplary embodiment of a portable phone 80. The phone 80 includes a display 82 and a keypad 84. Generally, the block diagram of FIG. 2 applies to the phone of FIG. 3, although additional circuitry necessary to perform other functions may be required. For instance, a transceiver necessary to operate as a phone will be required for the embodiment of FIG. 2; however, such circuitry is not pertinent to the present invention.

In addition to the portable or mobile computing devices described above, speech services can be used with numerous other computing devices such as a general desktop computer. For instance, the speech services can allow a user with limited physical abilities to input or enter text into a computer or other computing device when other conventional input devices, such as a full alpha-numeric keyboard, are too difficult to operate.

The speech services are also operational with numerous other general purpose or special purpose computing systems, environments or configurations. Examples of well known computing systems, environments, and/or configurations that may be suitable for use with the invention include, but are not limited to, regular telephones (without any screen) personal computers, server computers, hand-held or laptop devices, multiprocessor systems, microprocessor-based systems, set top boxes, programmable consumer electronics, radio frequency identification (RFID) devices, network PCs, minicomputers, mainframe computers, distributed computing environments that include any of the above systems or devices, and the like.

Figure 4:
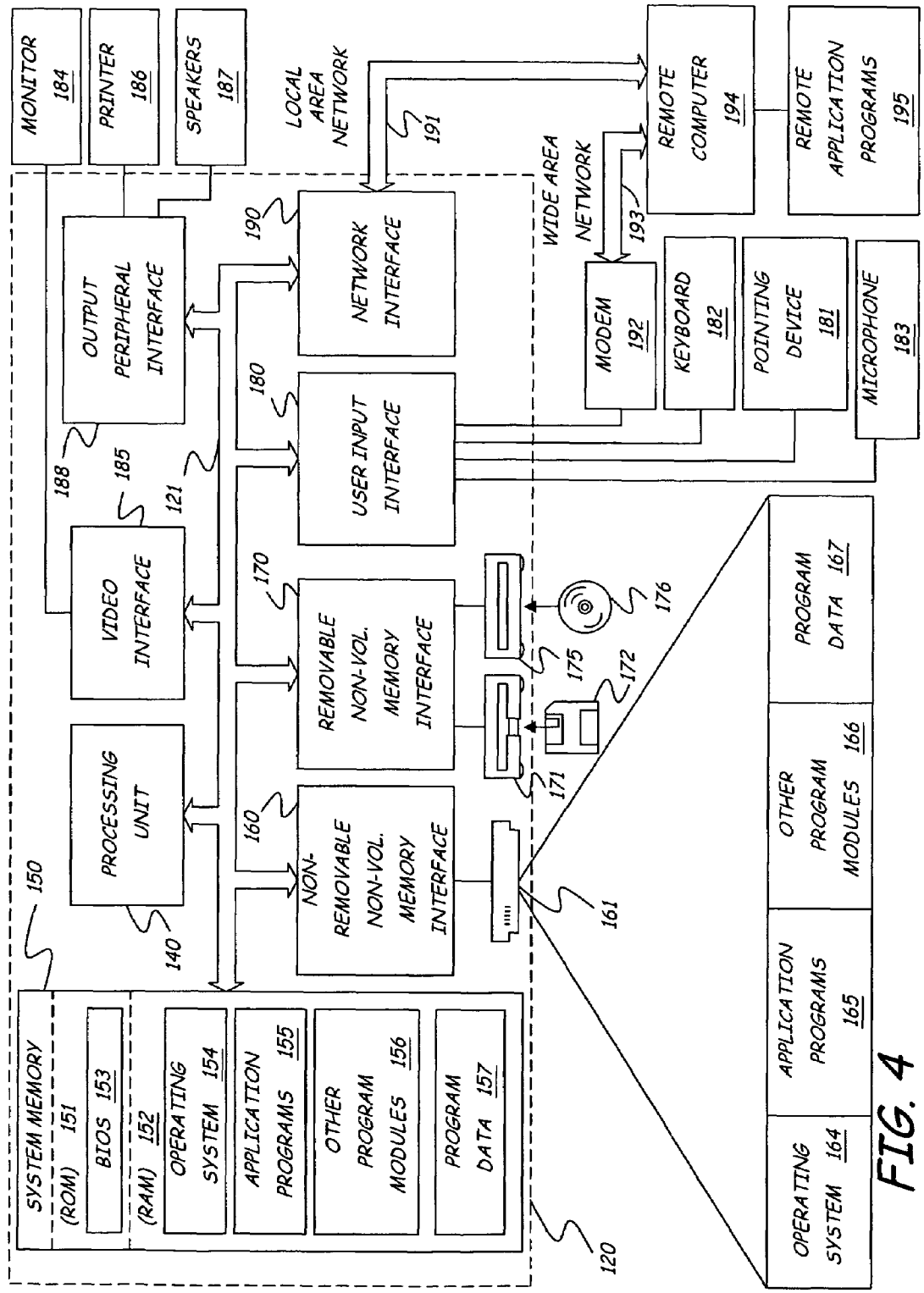

The following is a brief description of a general purpose computer 120 illustrated in FIG. 4. However, the computer 120 is again only one example of a suitable computing environment and is not intended to suggest any limitation as to the scope of use or functionality of the invention. Neither should the computer 120 be interpreted as having any dependency or requirement relating to any one or combination of components illustrated therein.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 4, components of computer 120 may include, but are not limited to, a processing unit 140, a system memory 150, and a system bus 141 that couples various system components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Universal Serial Bus (USB), Micro Channel Architecture (MCA) bus, Enhanced ISA (EISA) bus, Video Electronics Standards Association (VESA) local bus, and Peripheral Component Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 4 illustrates operating system 54, application programs 155, other program modules 156, and program data 157.

The computer 120 may also include other removable/non-removable volatile/nonvolatile computer storage media. By way of example only, FIG. 4 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 4, provide storage of computer readable instructions, data structures, program modules and other data for the computer 120. In FIG. 4, for example, hard disk drive 161 is illustrated as storing operating system 164, application programs 165, other program modules 166, and program data 167. Note that these components can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB). A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 4 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 4 illustrates remote application programs 195 as residing on remote computer 194. It will be appreciated that the network connections shown are exemplary and other means of establishing a communications link between the computers may be used.

Figure 5:
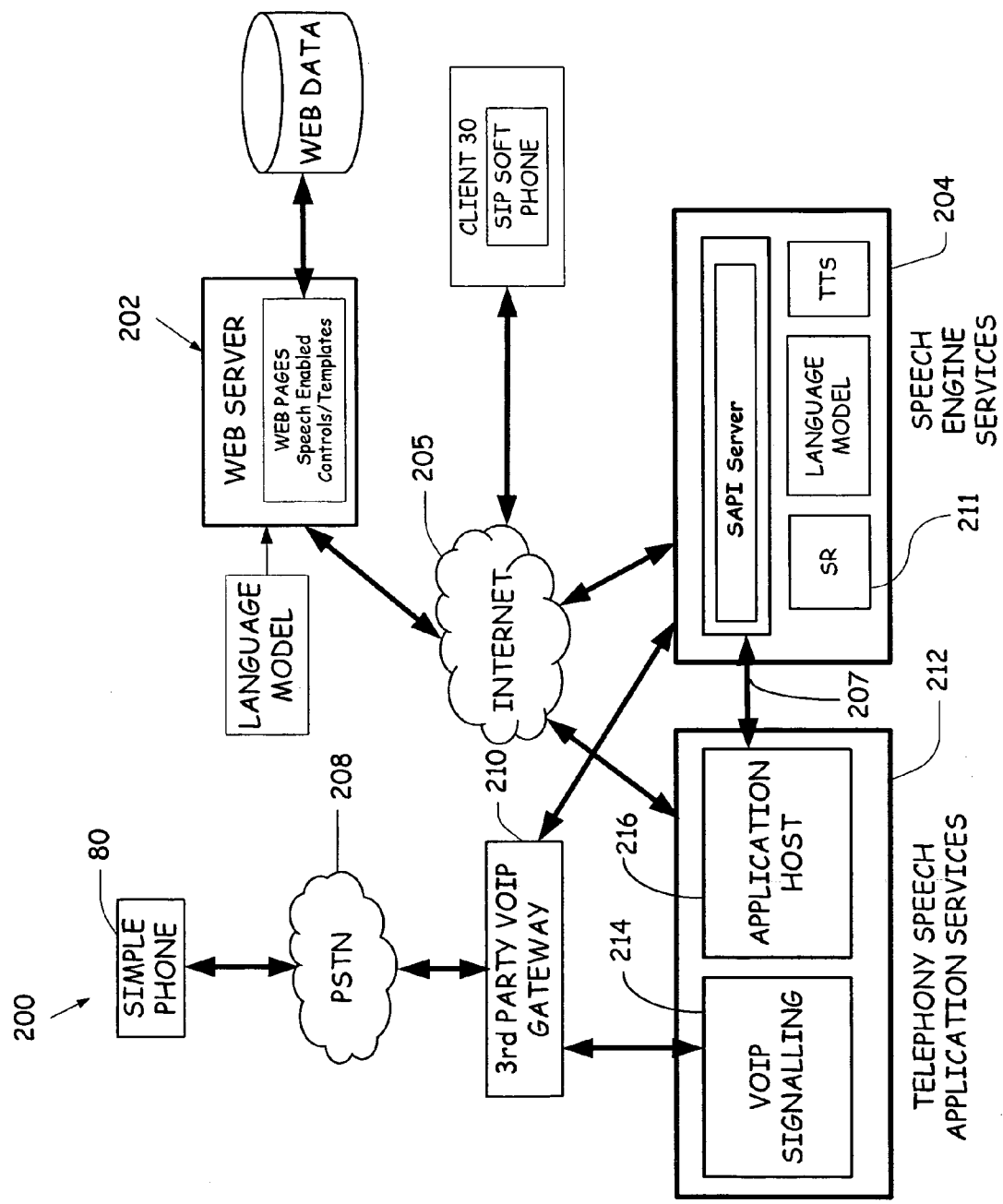
FIG. 5 illustrates an exemplary architecture for distributed speech services.

FIG. 5 illustrates an exemplary architecture 200 for distributed speech services as discussed above. Generally, information stored in a web server 202 can be accessed through mobile device 30 (which herein also represents other forms of computing devices having a display screen, a microphone, a camera, a touch sensitive panel, etc., as required based on the form of input), or through phone 80 wherein information is requested audibly or through tones generated by phone 80 in response to keys depressed and wherein information from web server 202 is provided only audibly back to the user.

More importantly though, architecture 200 is unified in that whether information is obtained through device 30 or phone 80 using speech recognition, speech engine services 204 can support either mode of operation. In addition, architecture 200 operates using an extension of well-known mark-up languages (e.g. HTML, XHTML, cHTML, XML, WML, and the like). Thus, information stored on web server 202 can also be accessed using well-known GUI methods found in these mark-up languages. By using an extension of well-known mark-up languages, authoring on the web server 202 is easier, and legacy applications currently existing can be also easily modified to include voice recognition.

Generally, device 30 executes HTML+ scripts, or the like, provided by web server 202. When voice recognition is required, by way of example, speech data, which can be digitized audio signals or speech features wherein the audio signals have been preprocessed by device 30 as discussed above, are provided to speech engine services 204 with an indication of a grammar or language model to use during speech recognition. The implementation of the speech engine services 204 can take many forms, one of which is illustrated, but generally includes a recognizer 211. The results of recognition are provided back to device 30 for local rendering if desired or appropriate. Upon compilation of information through recognition and any graphical user interface if used, device 30 sends the information to web server 202 for further processing and receipt of further HTML scripts, if necessary.

As illustrated in FIG. 5, device 30, web server 202 and speech engine services 204 are commonly connected, and separately addressable, through a network 205, herein a wide area network such as the Internet. It therefore is not necessary that any of these devices be physically located adjacent each other. In particular, it is not necessary that web server 202 includes speech server 204. In this manner, authoring at web server 202 can be focused on the application to which it is intended without the authors needing to know the intricacies of speech engine services 204. Rather, speech engine services 204 can be independently designed and connected to the network 205, and thereby, be updated and improved without further changes required at web server 202. In a further embodiment, client 30 can directly communicate with speech engine services 204, without the need for web server 202. It will further be appreciated that the web server 202, speech engine services 204 and client 30 may be combined depending on the capabilities of the implementing machines. For instance, if the client comprises a general purpose computer, e.g. a personal computer, the client may include the speech engine services 204. Likewise, if desired, the web server 202 and speech engine services 204 can be incorporated into a single machine.

Access to web server 202 through phone 80 includes connection of phone 80 to a wired or wireless telephone network 208 that, in turn, connects phone 80 to a third party gateway 210. Gateway 210 connects phone 80 to telephony speech application services 212. Telephony speech application services 212 include VoIP signaling 214 that provides a telephony interface and an application host 216. Like device 30, telephony speech application services 212 receives HTML scripts or the like from web server 202. More importantly though, the HTML scripts are of the form similar to HTML scripts provided to device 30. In this manner, web server 202 need not support device 30 and phone 80 separately, or even support standard GUI clients separately. Rather, a common mark-up language can be used. In addition, like device 30, voice recognition from audible signals transmitted by phone 80 are provided from application host 216 to speech engine services 204, either through the network 205, or through a dedicated line 207, for example, using TCP/IP. Web server 202, speech engine services 204 and telephone speech application services 212 can be embodied in any suitable computing environment such as the general purpose desktop computer illustrated in FIG. 4.

However, it should be noted that if DTMF recognition is employed, collection of DTMF signals would generally be performed at VoIP gateway 210. VoIP gateway 210 can send the signals to speech engine services 204 using a protocol such as Realtime Transport Protocol (RTP). Speech engine services 204 can interpret the signals using a grammar.

Figure 6:
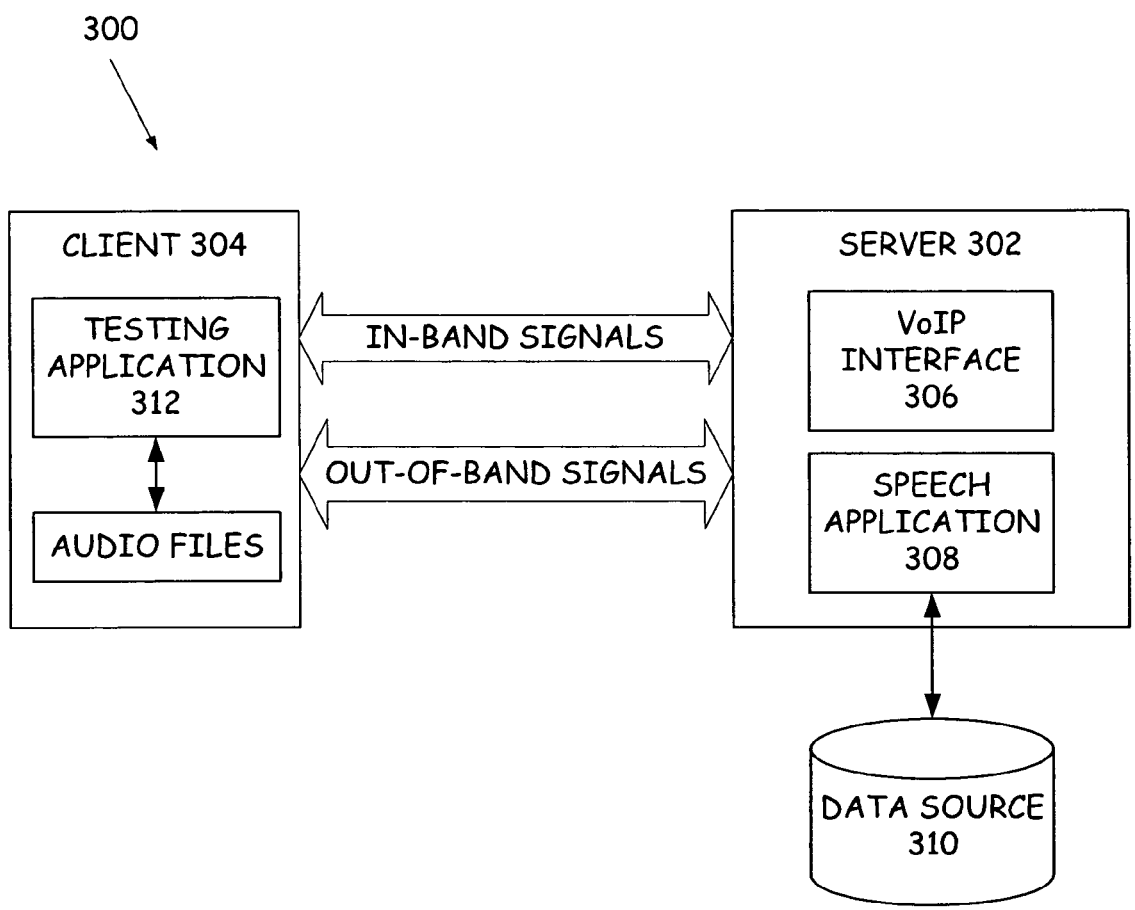
FIG. 6 illustrates an exemplary system for testing a speech application.

Given the devices and architecture described above, the present invention will further be described based on a simple client/server environment. As illustrated in FIG. 6, the present invention pertains to a system 300 comprising a server 302 that provides media services (e.g. speech recognition or text to speech synthesis) and a client 304 that executes a testing case or script. The server 302 and/or client 304 can collect and transmit audio in addition to other information. In one embodiment, server 302 can comprise Microsoft Speech Server developed by Microsoft Corporation of Redmond, Wash., while the client 304 can take any number of forms as discussed above, including but not limited to, desktop PCs, mobile devices, etc.

Communication between the server 302 and client 304 can be performed using a Voice-over-Internet-Protocol (VoIP) interface 306 provided on server 302. VoIP interface 306 provides an interface between server 302 and client 304, for example by providing signaling information and a media transport. In one embodiment, signaling information can be provided using the Session Initiation Protocol (SIP), an IETF standard for establishing a session between two devices, and the media transport can be provided using the Realtime Transport Protocol (RTP).

VoIP interface 306 can provide data to a speech application 308, although a plurality of speech applications can be used on speech server 302. Speech application 308 can provide speech recognition, text-to-speech synthesis and/or access to a data source 310 to facilitate a speech interface with client 304.

Speech application 308 can be a simple directed dialog application or a more complex mixed initiative application that performs actions based on speech input from a user. Directed dialog applications "direct" a user to present information based on a predefined set of steps that usually occur in a sequential manner. Mixed initiative applications allow a user more flexibility in providing input to the application.

In either case, the speech application 308 has an expected flow based on speech input from a user. The flow represents transitions to various dialog states within the application. For example, once a user has provided information that is recognized by speech application 308, the application will proceed to the next dialog state. Tracking and synchronizing the present dialog state for speech application 308 can provide valuable testing information. For example, if recognition errors consistently occur with respect to a particular dialog state, the grammar that is used during that dialog state may need to be corrected.

A testing application or harness 312 is used to simulate a user interaction with speech application 308. In order to test speech application 308, testing application 312 can play audio files, receive audio files, interpret information from speech application 308 as well as respond to information received from speech application 308. The information received is interpreted using an application program interface (API) that can automatically log certain measurements that are of interest in testing speech application 308. These measurements relate to recognition and synthesis latencies, quality of service (QoS), barge-in latency, success/failure and call-answer latency.

By using a combination of in-band signals and out-of-band signals, information exchanged between server 302 and client 304 can be used to generate valuable test data to evaluate speech application 308. Using SIP, server 302 can send information to client 304 related to testing information such as dialog states, recognition results and prompts. By interpreting the testing information and comparing expected information to the testing information, testing application 312 can determine various measures for evaluating speech application 308. In one example, a SIP INFO message can be sent out-of-band with a serialized form of a recognition result to testing application 312. The testing application 312 can compare the recognition result with an expected recognition result. A failure is logged if the recognition result does not match the expected recognition result.

Testing application 312 is also able to perform multiple tests simultaneously in order to evaluate the capacity of server 302 to handle multiple requests to speech application 308. In this manner, the multiple requests are sent and failures can be logged. If server 302 is unable to handle desired capacity, additional implementations of speech application 308 and/or additional servers may be needed.

Testing application 312 can include several features to enhance testing of speech application 308. For example, testing application 312 can support basic call control features such as initiating SIP sessions (making calls) to a speech server, leaving a SIP session (local call disconnect) at any time, handling a server leaving a SIP session (far-end disconnect), basic call logging (for low-level diagnostic tracing), receiving calls, answering calls and emulating call transfers.

In addition, the testing application can be configured to handle media, for example playing an audio file to simulate a caller's response, a mechanism for randomly delaying playback to enable barge-in scenarios, receiving audio data for testing speech synthesis operations and QoS measures, recording to a file for Question/Answer (QA) checking, generating DTMF tones and allowing a user to "listen" in on a simulated call.

In order to automatically test speech application 308, testing application 312 can include a method for synchronizing with certain dialog application events in the speech application 308. This feature will allow the testing application 312 (or script executed by the application) to decide on the next operation information to provide to speech application 308.

Speech application 308 provides a mechanism to provide synchronization information automatically. The testing application 312 accepts this synchronization information and responds to it (a SIP response can be used, for example). Exemplary dialog synchronization events include a playback started event (including prompt/QA identifier), a playback completed event (including prompt/QA identifier) and a recognition completed event that includes a recognition result (and QA identifier).

Testing application 312 can also include a script to interact with the speech application 308 under test for the automated testing mode. The testing application provides a test case developer with flexibility to create test cases executed by the testing application 312. Testing application 312 can include a simple object model for test case development. The object model can allow a test case developer to minimally support operations such as placing a call, disconnecting a call, answering a call, playing an audio file (to simulate a caller's voice response), generating DTMF (to simulate a caller's touch tone response), indicating dialog path success/failure (for reporting) and a mechanism for sending a synchronization message. Also, the model can support event notifications such as an incoming call, a far-end disconnected event a transfer requested (unattended and attended), prompt started (with dialog state and prompt information), prompt completed (with dialog state and prompt information) and recognition completed (with dialog state, recognition and recognition result information).

The testing application 312 can also include configuration settings for operation. The following represents exemplary configuration settings:

A location for the speech application under test (IP address)
  Specifying test applications and/or scripts to load
  A number of outbound SIP channels (represents the maximum number of simultaneous SIP sessions initiated by the testing application 312) per test case or script
  A number of inbound SIP channels (represents the maximum number of simultaneous SIP sessions initiated by the speech application 308 that the testing application 312 will accept) per test
  Call loading settings such as inter-call delay, number of calls per hour and simulation of call center busy hours and quiet periods (for example by cycling between a maximum number of calls to zero calls on a regular basis)
  A random remote caller disconnect simulation (can also be scriptable in the test application 312)
  Logging location
  Logging verbosity To operate in an automatic test mode, the testing application 312 can provide basic progress reporting, including some basic measures such as calls placed, calls answered, failures, successes, latencies etc., and more detailed reporting at each dialog state, in particular at each QA dialog turn. Additionally, QoS metrics can be included, for example those related to speech quality.

An example for conducting a test of a speech flight reservation system will be discussed with reference to testing application 312 and speech application 308. The example represents a simplified speech application with a plurality of dialog states. The testing application includes a script to request a schedule for flights from Seattle to Boston.

The testing application 312 begins by setting up configuration parameters as discussed above for testing speech application 308. These parameters can include a number of simultaneous channels for load testing speech application 308. A session can then be established between the client 304 and server 302, for example by using SIP, and a simulated call is made from testing application 312 to speech application 308.

Upon answering the call, speech application 308 plays a prompt, "Welcome, where would you like to fly?" In addition to playing the prompt, an out-of-band signal indicative of the prompt and the present dialog state is sent to the testing application 312. Testing application 312 interprets the out-of-band signal and compares the present dialog state with an expected dialog state. Additionally, call answer latency as well as QoS measures can be logged based on the information sent from speech application 308.

Having the prompt information, and thus knowing what input the speech application is expecting, testing application 312 can play a suitable audio file based on the prompt. For example, the testing application 312 plays an audio file that simulates a user response such as, "I want to fly from Seattle to Boston." This audio is sent using RTP to server 302. Speech application 308 then performs speech recognition on the audio data. The recognition result is used to drive speech application 308.

In this case, a grammar associated with speech application 308 would interpret, from the user's input, "Seattle" as a departure city and "Boston" as an arrival city. These values could be filled in the speech application 308 and the dialog state would be updated. Speech application 308 then would play a prompt for testing application 312 based on the present dialog state. For example, the prompt, transmitted as an in-band signal, could be, "What date do you wish to travel?"

In addition to the prompt, an out-of-band signal is sent with a serialized form of the recognition result, an indication of the prompt that is played and an indication of the present dialog state. The out-of-band signal can be sent using any application communication interface, for example using SIP INFO or other mechanisms such as .NET Remoting. The information in the out-of-band signal is compared to an expected recognition result, in this case "Seattle" and "Boston, an expected prompt and an expected dialog state. If any of the information sent does not match their expected counterparts, testing application 312 can log the mismatch along with other data that may be useful, such as the present dialog state for the speech application, whether the recognition result was incorrect and whether the correct prompt was played.

Assuming the correct prompt is played (i.e. "What date do you wish to travel?"), testing application 312 can then play another audio file to be interpreted by speech application 308. Testing application 312 can also simulate silence and/or provide a barge-in scenario, where a user's voice is simulated at a random time to be interpreted by speech application 308. In the example, testing application 312 plays an audio file to simulate a voice saying, "Tomorrow".

Speech application 308 processes this speech data in a manner similar to that discussed above. After processing the speech to obtain a recognition result, the present dialog state is updated and a prompt is sent based on the recognition result. The recognition result, present dialog state and an indication of the prompt are sent out-of-band. For example, the prompt could include, "The schedule for tomorrow is . . . " The test continues until testing application 312 is finished and disconnects with server 302.

As a result, an efficient automated testing system for a speech application is achieved. The system can be employed without the need for specialized hardware, but rather can utilize an existing architecture, for example by using VoIP and SIP. The system can track failures for a particular dialog state, a particular recognition result and for the ability of an application to handle a large capacity.

Although the present invention has been described with reference to particular embodiments, workers skilled in the art will recognize that changes may be made in form and detail without departing from the spirit and scope of the invention

What is claimed is:

1. A method of testing a speech application on a server by simulating an interaction between a client and the server, comprising:

establishing a session between the client and the server, including establishing configuration parameters;

transmitting, after establishing the session, audio data indicative of simulated user speech from the client to the server; and performing speech recognition on the audio data at the server in order to provide to the client an in-band signal indicative of an audible response to the simulated user speech and an out-of-band signal indicative of testing synchronization information related to the test, wherein the audible response and the testing synchronization information are based on recognition of the audio data;

comparing the audible response and testing synchronization information with an expected audible response and expected testing synchronization information to determine a status of the speech application; and storing information on a computer storage medium indicative of the status of the speech application.

2. The method of claim 1 wherein the response is a prompt requesting additional information.

3. The method of claim 1 wherein the testing synchronization information includes a present dialog state.

4. The method of claim 1 wherein the testing synchronization information includes a recognition result.

5. The method of claim 1 and further comprising establishing multiple sessions between the client and the server.

6. The method of claim 1 wherein the out-of-band signal is based on an application communication interface.

7. The method of claim 1, wherein transmitting audio data indicative of simulated user speech includes transmitting audio data from a predefined test dialog between the client and the server.

8. The method of claim 7, wherein transmitting audio data from a predefined test dialog includes retrieving the audio data from the client.

9. A computer storage medium storing instructions that, when accessed and executed by a processor, perform a method for testing a speech application at a remote device, the method comprising:

transmitting simulated speech data to the speech application from the remote device to be recognized by the remote device;

receiving a prompt and a recognition result based on the speech data at the remote device;

comparing the prompt and the recognition result with an expected prompt and an expected recognition result retrieved from the computer storage medium for the purpose of evaluating the speech application; and storing information collected by comparing the prompt and recognition result with an expected prompt and an expected recognition result indicative of the quality of the speech application.

10. The computer storage medium of claim 9 wherein storing information includes logging a failure if the recognition result does not match the expected recognition result.

11. The computer storage medium of claim 9 wherein storing information includes logging a failure if the prompt does not match the expected prompt.

12. The computer storage medium of claim 9 wherein storing information includes storing information measuring latency between transmitting the speech data and receiving the prompt.

13. The computer storage medium of claim 9 wherein the method further comprises transmitting further simulated speech data based on the prompt.

14. The computer storage medium of claim 9 wherein the method further comprises simulating silence based on the prompt.

15. The computer storage medium of claim 9 wherein the method further comprises configuring testing parameters to test the speech application.

16. The computer storage medium of claim 9 wherein the method further comprises identifying an audio file containing the speech data.

* * * * *